United States Patent [19]
Löffler

[11] Patent Number: 4,746,188
[45] Date of Patent: May 24, 1988

[54] LIGHT WAVEGUIDE PLUG

[75] Inventor: Herbert Löffler, Munich, Fed. Rep. of Germany

[73] Assignee: Siemens Aktiengesellschaft, Berlin & Munich, Fed. Rep. of Germany

[21] Appl. No.: 875,958

[22] Filed: Jun. 19, 1986

[30] Foreign Application Priority Data

Jun. 21, 1985 [DE] Fed. Rep. of Germany ....... 3522288

[51] Int. Cl.$^4$ ................................................ G02B 6/36
[52] U.S. Cl. .................................................. 350/96.20
[58] Field of Search ........................... 350/96.20, 96.18

[56] References Cited

U.S. PATENT DOCUMENTS

| | | | |
|---|---|---|---|
| 4,303,301 | 12/1981 | Teichert et al. | 350/96.18 |
| 4,351,586 | 9/1982 | Phillips et al. | 350/96.20 |
| 4,665,529 | 5/1987 | Baer et al. | 350/96.18 X |

FOREIGN PATENT DOCUMENTS

| | | |
|---|---|---|
| 0022374 | 1/1981 | European Pat. Off. . |
| 2704140 | 8/1978 | Fed. Rep. of Germany . |
| 2918024 | 11/1980 | Fed. Rep. of Germany . |
| 3238049 | 3/1984 | Fed. Rep. of Germany . |
| 2289927 | 5/1976 | France . |
| 1508138 | 4/1978 | United Kingdom . |

OTHER PUBLICATIONS

*Patent Abstracts of Japan*, vol. 1, No. 117, p. 4568 of Japanese Patent 52-49039, 4/19/77.
*Patent Abstracts of Japan*, vol. 4, No. 86(P-16)(568) of Japanese Patent 55-48709, 8/4/80.

*Primary Examiner*—John Lee
*Assistant Examiner*—Phan Heartney
*Attorney, Agent, or Firm*—Hill, Van Santen, Steadman & Simpson

[57] ABSTRACT

An improvement in a light waveguide plug which enables compensating for offsets due to tolerances in the parts characterized by a plug pin having an internal clamp seat for receiving a swivel member. The swivel member has a projection or stem with a portion extending out of a free end of the plug pin. The end sticking out of the plug pin has the waveguide surface flush with the surface of the end and that surface has a crown or slightly convex surface. The swivel member can be moved so that the offset can be corrected up to approximately 4μ. Thus, the end of the optical fibers exit and entrance surface can be concentrically disposed to lie on the axis of the waveguide plug.

7 Claims, 1 Drawing Sheet

LIGHT WAVEGUIDE PLUG

BACKGROUND OF THE INVENTION

The present invention is directed to a light waveguide plug having a plug pin which has outside guide surfaces extending parallel to an axis and a swivel member seated in the plug pin in a clamp-type seat. The swivel member has a shoulder which is directed towards a free end of the plug pin and in which an end portion of an optical fiber is fixed with the exit and entry end face of the fiber lying in or flush with the surface of the shoulder to form an optical coupling surface for the light waveguide plug.

Light waveguide plugs which have a swivel member are known from French Patent Disclosure No. A-2 289 927 corresponding to German No. A-25 47 420. In this known plug, the rotatability of the swivel member is used in order to bring the free end of the optical fiber into a position which is situated exactly coaxially with the guide surfaces of the plug member.

When, however, the optical fiber, which is to be optically connected to, for example, a continuing optical fiber with the assistance of such a plug, is what is referred to as a monomode fiber, the tolerance are very small. Thus, the swivel member itself and the optical fiber and the swivel member would have to be fastened with such low tolerances in order to obtain a precise coaxial position of the fiber relative to the sheathing that such a plug could ultimately no longer be economically manufactured.

SUMMARY OF THE INVENTION

The object of the present invention is to provide an improved light waveguide plug, which allows a transverse offset of the end face of the light waveguide relative to the axis of an additional coupling surface so that the end face of the light waveguide can be compensated given no possibility of an axis-parallel alignment of the end portions of the light waveguide to the guide surface of the plug pin so that the optical coupling conditions remains as optimum as possible.

In order to accomplish these goals, the present invention is directed to an improvement in a light waveguide plug having a plug pin which has outside guide surfaces extending parallel to the axis such as a cylindrical surface which is concentric with the axis and contains a swivel member which is seated in the plug pin in a clamped seat provided therein. The swivel member has a shoulder or stem-like projection which is directed towards a free end of the plug pin and in which an end portion of the optical fiber is fixed with the end face, which acts as an exit and entry face, of the fiber, lying in an end surface of the stem-like projection to form the optical coupling surface for the light waveguide plug. The improvements are that the end surface of the stem-like projection, as well as the end face of the optical fiber, which coact to form the coupling surface, have a crown or convex curved surface and that the free end of the stem-like projection is dimensioned to project from the plug pin to form an adjustment element of the swivel member at the end of the plug pin that can be grasped from the outside.

Thus, given a maximum swivel angle of about ¼°, a transverse displacement of about 4µ can be achieved for the end face of the light waveguide. The slight oblique position of the end face of the light waveguide, which can thereby occur, is largely compensated by the crowned or convex curved surface of the light waveguide and the free end of the stem-like projection of the swivel member. Since the waveguide end faces of the two such waveguide plugs are pressed against each other with a slight pressure, they can now automatically "level" and a good optical contact between the two light waveguides will thus occur.

It can be further provided within the framework of the present invention that the swivel member and the stem-like shoulder or projection can be realized as a common means by a roughly pear-shaped member. A one-piece and, therefore, easily handled swivel member part can be derived in this way. Finally, it is also provided that the swivel member is seated in an insert fixed in the bore of the plug pin and which insert is provided with a radial slot. Such an insert is advantageous when the plug pin itself is composed, for example, of a hard metal. The insert can be composed of a material, for example brass or German silver (nickel silver), that creates optimum bearing conditions for the swivel member which is also composed, for example, of German silver. The elasticity of the swivel member and, thus, its seating in the plug pin are further improved by the provision of the slot in the seat member.

Further advantages and objects of the present invention will be apparent from the following two exemplary embodiments of the invention.

DESCRIPTION OF THE PREFERRED EMBODIMENTS

Figure 1:
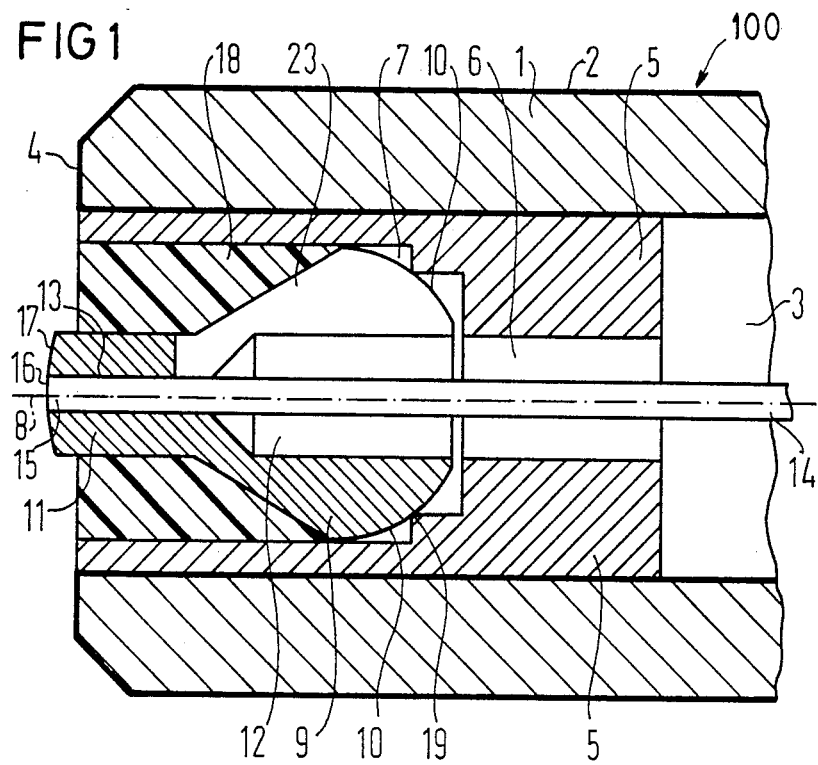
FIG. 1 is a longitudinal cross section through an end of a plug pin in accordance with the present invention.

The principles of the present invention can be incorporated in a light waveguide plug generally indicated at 100 in FIG. 1. The plug 100 includes a plug pin 1 which is composed, for example, of a hard metal and which is provided with a high-precision cylindrical outside surface 2 which is concentric with an axis 8. A concentric longitudinal bore 3 extends through the plug pin 1. An insert 5, which, for example, can be composed of brass or German silver (nickel silver), is seated in this longitudinal bore 3 in the proximity of a free end 4 of the plug pin 1. A bore 6, which extends through the insert 5 is concentric with the bore 3 of the plug pin 1 and the axis 8. The bore 6 at an end of the insert facing the free end 4 has a plurality of counter bores to form a chamber 7 with an annular seating surface or edge 19. The chamber 7, which is fashioned to be rotationally symmetrical relative to an axis 8 of the plug pin 1, forms an acceptance space for a swivel member 9.

The swivel member 9, which is likewise rotationally symmetrical relative to the axis 8, has a limiting surface 10 which, for example, corresponds to a spherical surface. The swivel member 9 is seated in the clamp seat in the chamber 7 of the insert 5 and, therefore, does not automatically change its position in the chamber 7 unless an external force acts thereon. However, the member can execute a rotational movement up to ½° in all directions by means of adjustment which occurs by applying an external force. The swivel member 9 is provided with a stem-like shoulder or projection 11 which is directed to a free end 4 of the plug pin 1.

In the exemplary embodiment of FIG. 1, the stem-like projection or shoulder 11 is an integral component of the swivel member 9 which, thus, has a roughly pear-shaped configuration together with the shoulder 11. Together with the shoulder 11, the swivel member 9 has a concentric bore 12 which is constricted in an end region 13 to a diameter of a stripped optical fiber 14. The optical fiber will extend through the bore 3 of the plug pin 1 and the bore 6 of the insert and has its end section 15, which is immediately adjacent an end face or coupling surface 16 which can be a light exit and entry face of the fiber 14, seated in the end region 13 of the bore 12.

At the side of the free end of the plug pin 1, the shoulder or projection 11 projects somewhat from the plug pin so that an optical coupling surface 16 of the light waveguide 14, which is formed by the light exit and/or entrance face of the waveguide 14, likewise projects from the plug pin 1. By means of appropriate grinding, the coupling surface 16 is made flush with a free end 17 of the stem or shoulder 11 and this end 17 is rounded in a crown fashion together with this coupling surface to provide a slightly convex curved surface.

Since the outside diameter of the stem 11 is significantly smaller than the inside diameter of the insert 5 or, respectively, of the plug pin 1, the stem 11 is surrounded by free space 18 which enables the shoulder 11 to be grasped from the outside when the swivel member 9 is seated in its final position within the plug pin. Stop faces or, respectively, stop edge 19 thereby limits further introduction of tne swivel member into the insert 5 of the plug pin 1. The radial slot 23 provided in the swivel member lend the latter with a certain elasticity and improves the clamp seating of the swivel member in the insert 5 because the slots allow a portion of the swivel member to be pressed somewhat together.

Figure 2:
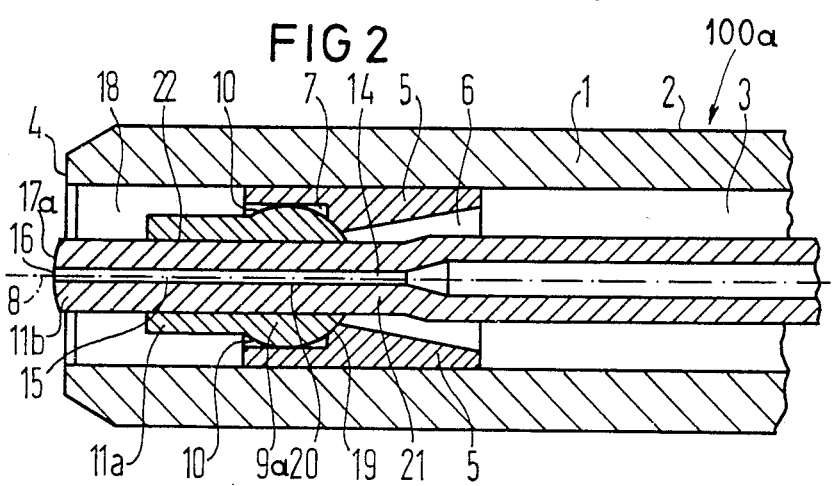
FIG. 2 is a longitudinal cross section through an end of an embodiment of the plug pin of FIG. 1.

Another embodiment of the plug pin is generally indicated at 100a in FIG. 2. In this embodiment, the stripped light-conducting fiber 14, whose core is the actual light waveguide, is arranged in a concentric bore 20 of a small metallic tube 21 and the small tube 21 is in turn fixed in a concentric bore 22 of a swivel member 9a. The fixing of the small tube 21 in the swivel member 9a can advantageously occur in that, for example, the swivel member 9a is heated and then subsequently slipped onto the small tube and then seizes on the small tube after member 9a has cooled. In the exemplary embodiment of FIG. 2, the swivel member 9a has a stem-like shoulder 11a, which, however, has an end portion 11b of the small tube 21 extending beyond a free end 4 of the plug pin 1. The crown design of a slightly convex curved surface of the light waveguide coupling surface 16 and a free end 17a of the end portion 11b of the small tube likewise corresponds to the design of the corresponding similar parts in the embodiment of the plug pin 100 of FIG. 1.

The shoulder or stem 11 of FIG. 1 or the shoulder or stem 11a and 11b of FIG. 2 has its axis and thus, the axis of the light waveguide 14 aligned parallel to the axis 8 of the plug pin 1. However, despite relatively great care in the manufacturing of individual parts of the light waveguide plug 100 or 100a, an offset between the axis 8 of the plug pin 1 and the axis of the light waveguide 14 fixed in the shoulder will occur due to the tolerances utilized in manufacturing.

This offset now can be compensated in that, with the help of a suitably fashioned tool, the projection or shoulder 11 at the free end 9 of the plug pin 1 is grasped and the swivel member 9 is turned slightly until the intersection of the axis of the light waveguide 14 with the coupling surface 16, i.e. the center of the coupling surface 16, lies on the axis 8 of the plug pin. In the manufacture and assembly of the individual parts of the light waveguide plug, the axial offset can be kept in a range that is less than $4\mu$. When the relative length of the shoulder 11, i.e. the distance of the coupling surface 16 from the pivot point of the swivel member 9, is dimensioned adequately large, then an oblique attitude of at most $\frac{1}{4}°$ of the axis of the light waveguide 14 relative to the axis 8 of the plug pin will suffic in order to bring the center of the coupling surface 16 into coincidence with the axis 8.

Particularly in view of the crowned fashioning of this surface, such an oblique position of the coupling surface 16 can be accepted especially when a further, identical coupling surface 16 is brought into contact with the coupling surface 16 so that the two coupling surfaces are held pressed slightly against one another. As a result thereof, namely, a mutual automatic "levelling" of the coupling surfaces 16 is achieved. This will lead to a low-loss connection between two light waveguides which ends in the coupling surface 16.

The optimum adjustment of the swivel member 9 and, thus, of the shoulder 11 can be secured by filling the remaining portion of the free space 18 with a hardening glue after the adjustment (see FIG. 1). However, the clamp seat 5 and the swivel member 9 also maintains the angular position of the swivel member adjustment via the shoulder 11 without this fixing measure. Thus, the light waveguide plug 100 or 100a constructed in this way can be immediately removed from the adjustment device after the adjustment operation. Thus, after a swivel member has been adjusted there is no fear that the swivel member will in turn automatically maladjust.

Although various minor modifications may be suggested by those versed in the art, it should be understood that I wish to embody within the scope of the patent granted hereon, all such modifications as reasonably and properly come within the scope of my contribution to the art.

I claim:

1. In a light waveguide plug having a plug pin, which has outside guide surfaces parallel to an axis of the plug, and a swivel member seated in the plug pin in a clamp seat, said swivel member having a stem-like projection which is directed towards a free end of the plug pin and in which an end portion of an optical fiber is fixed, said stem-like projection having a free end with an end face in which an end face of the optical fiber is flushed to form an optical coupling surface for the light waveguide plug, the improvement comprising the free end faces of the stem-like projection of the swivel member and the optical fiber being provided with a convex curved surface, said convex curved surface of the free end of the stem-like projection being dimensioned to project from the plug pin so that the stem-like projection forms an adjustment element of the swivel member at the free end of the plug pin and can be grasped from the outside of the waveguide plug.

2. In a light waveguide plug according to claim 1, wherein the swivel member and a stem-like projection, have a shape roughly corresponding to a pear-shaped member.

3. In a light waveguide plug according to claim 2, wherein the clamp seat is formed by an insert received in a bore of the plug pin and the swivel member is provided with at least one radial slot to increase its elasticity.

4. In a light waveguide plug according to claim 1, wherein the swivel member has a radial slot and the clamp seat is formed by an insert fixed in a bore of the plug pin.

5. In a light waveguide plug according to claim 1, wherein the swivel member includes a concentrically received tube for receiving the optical fiber, said convex curved surface being provided on an end of said tube.

6. In a light waveguide plug according to claim 5, wherein the clamp seat is formed by an insert received in a bore of the plug pin and said swivel member has a least one radial groove to increase the elasticity of the swivel member.

7. In a light waveguide plug according to claim 5, wherein the swivel member and tube have a shape corresponding roughly to a pear-shaped member.

* * * * *